(12) United States Patent
Lin et al.

(10) Patent No.: US 7,310,813 B2
(45) Date of Patent: Dec. 18, 2007

(54) SYSTEM AND METHOD FOR STRONG ACCESS CONTROL TO A NETWORK

(75) Inventors: Paul Lin, Fremont, CA (US); Henry Hon, Berkeley, CA (US); Jenny Lu, Union City, CA (US)

(73) Assignee: Authenex, Inc., Hayward, CA (US)

( * ) Notice: Subject to any disclaimer, the term of this patent is extended or adjusted under 35 U.S.C. 154(b) by 847 days.

(21) Appl. No.: 10/675,496

(22) Filed: Sep. 30, 2003

(65) Prior Publication Data

US 2004/0064740 A1 Apr. 1, 2004

Related U.S. Application Data

(60) Provisional application No. 60/415,275, filed on Sep. 30, 2002.

(51) Int. Cl.
*H04L 29/00* (2006.01)
(52) U.S. Cl. .......................................................... 726/3
(58) Field of Classification Search .................... 726/2, 726/3
See application file for complete search history.

(56) References Cited

U.S. PATENT DOCUMENTS 6,070,243 A * 5/2000 See et al. ........................ 726/2
7,194,761 B1 * 3/2007 Champagne ..................... 726/6
2002/0178385 A1 * 11/2002 Dent et al. ..................... 713/202
2004/0073791 A1 * 4/2004 Vollmer et al. ............... 713/168
2004/0097217 A1 * 5/2004 McClain ....................... 455/411

* cited by examiner

*Primary Examiner*—Matthew B Smithers
(74) *Attorney, Agent, or Firm*—David R. Stevens; Stevens Law Group

(57) ABSTRACT

A system and method for strong access control to a network is provided. An access control server and authentication device are provided for controlling access to a network. The access controlled by the access control server may include network protocols, network resources, and electronic devices that may be coupled to the network. Network resources may include data stored on the network. The access control server may grant access to the network to a user based upon a correct response received from an authentication device assigned to the user. The user may be able to access only selected data that may be determined by an access level assigned to the authentication device. Upon authentication, the authentication device must remain active to maintain a network session. The authentication device becomes inactive when it is deactivated, uncoupled from the network, or in any mode in which the device cannot produce a response to the access control server. The network session ends when it is determined that the authentication device is inactive.

12 Claims, 2 Drawing Sheets

SYSTEM AND METHOD FOR STRONG ACCESS CONTROL TO A NETWORK

CROSS-REFERENCE TO RELATED APPLICATIONS

This Application is a non-provisional application of Provisional Application No. 60/415,275, filed on Sep. 30, 2002.

BACKGROUND OF THE INVENTION

1. Field of the Invention

The present invention relates to systems and methods for controlling access to networks, and more particularly, to a system and method for strong access control to a network.

2. Background Information

A computer network may comprise two or more interconnected computer servers. The network includes network resources that enable interoperability of the interconnected servers. Network resources may include physical devices such as routers, hubs, firewalls, VPN, RADIUS, printers, and electronic devices. These electronic devices include may include a Personal Digital Assistant (PDA), cellular phone, computer gaming equipment, and other known and emerging electronic devices. Network resources may also include data that is stored on public and private servers coupled to the network. The data may comprise web sites and web pages, script files, executable files, email files, and other data.

Network protocols comprise sets of technical rules as to how information is exchanged between interconnected servers and other devices of the network. Such network protocols include wire and wireless protocols such as TCP/IP, UDP, and network data packets.

One or more servers of the network may comprise an access control server, for controlling access to data stored on the network. The access control server may control data received by and transmitted from the network. The access control server may use different processes for granting users access to the network. A known challenge and response process may be used to authenticate a user. Alternatively, a user may be required to input a username and password in order to access a controlled web site.

A known disadvantage of prior art network access control methods is that once a user is authenticated, they may access controlled data on the network until they log off the network or their session is timed out. Thus, their network session may remain active during periods of inactivity, such as when a user temporarily departs from a computer they may be using. Another disadvantage of the prior art is, that a user may not need to be authenticated for each web page of a web site they may be accessing.

BRIEF SUMMARY OF THE INVENTION

The present invention provides a system and method for strong access control to a network. The invention utilizes two-factor authentication to authenticate a user, to maintain a network session, and to terminate the network session.

An access control server and authentication device are provided to control authentication to a network. The access controlled by the access control server may include network protocols, network resources, and electronic devices that may be coupled to the network. Network resources may include data stored on public and private servers controlled by the access control server. The data may comprise web sites and web pages, script files, executable files, email files, and other data.

The access control server may control both data received by the network and data transmitted from the network. The access control server may grant access to the network to a user based upon a response received from an authentication device assigned to the user. The authentication device may transmit a response to the access control server for authentication to the network. A correct response by the device authenticates the device, and thus the user, granting the user access to the network.

The user may be able to access only selected data. The selected data may be determined by an access level assigned to the authentication device. Information for determining the access level of the authentication device may be stored on the access control server or may be stored on a remote computer coupled to the server.

After a successful authentication, the authentication device must remain active to maintain a network session through the access control server. The network session may be defined as a period of time between the moment an authentication device attempts to access the network and the moment that the device becomes inactive and no longer has access to the network. The authentication device becomes inactive when it is deactivated, logged out, uncoupled from the network, cannot be verified to be active, or in any modes in which the authentication device cannot produce a response to the access control server. When it is determined that the authentication device is inactive, the network session ends.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Disclosed is a system and method for strong access control to a network. The invention utilizes two-factor authentication to provide strong access control to authenticate a user, to maintain a network session, and to terminate the network session. When authenticating a user, a value derived from an authentication device during an initial authentication, is used to maintain a network session. The initial authentication may be performed though a one-time password or challenge and response process. Upon authentication, a one time unique and encrypted key is created.

The network session is maintained by each request to access the network being encrypted and including the encrypted key. The user may be able to access only selected data that may be determined by an access level assigned to the authentication device. The authentication device must remain active to maintain the network session. The authentication device becomes inactive when it is deactivated, uncoupled from the network, or in any mode in which the device cannot produce a response to the access control server. The network session ends when it is determined that the authentication device is inactive.

An access control server is provided for controlling access to one or more networks. The access controlled by the access control server may include network protocols, network resources, and electronic devices that may be coupled to the network. Network resources may include data stored on the network. The access control server may grant access to the network to a user based upon a correct response received from an authentication device assigned to the user.

Figure 1:
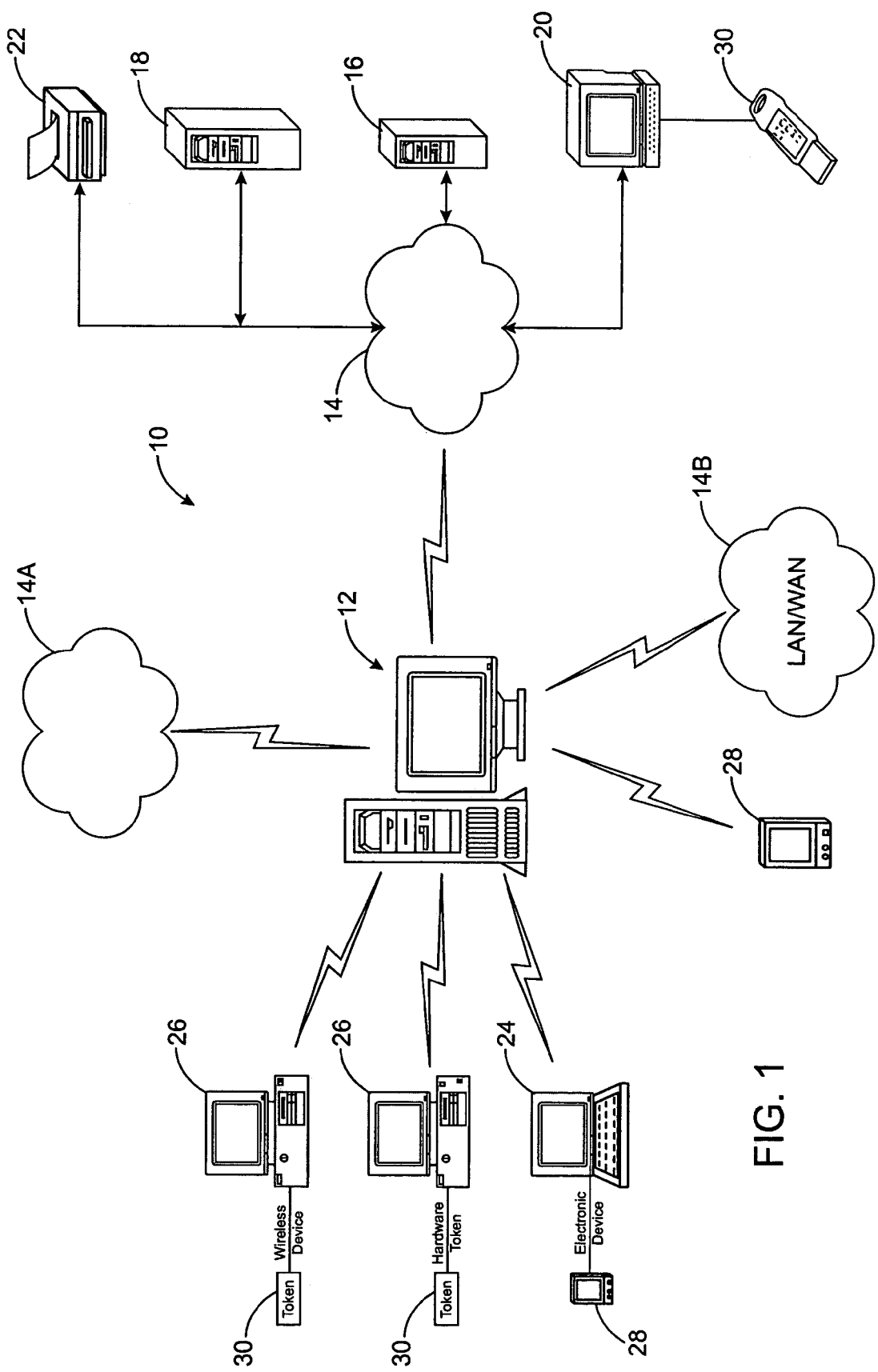
FIG. 1 is a schematic diagram showing an embodiment of a system of the present invention.

Referring to the drawings more particularly by reference numbers, FIG. 1 shows an embodiment of a system 10 of the present invention. The system 10 may include an access control server 12 provided to control authentication to a network 14 or multiplicity of networks.

It is to be understood that the network 14 may comprise any known multiplicity of electronically interconnected computing devices. By way of example, the computer network 14 may comprise the Internet 14A, a LAN/WAN network 14B, a Remote VPN network or a wireless network (both not shown), or any suitable network of computing devices.

The access control server 12 may comprise any suitable computer server known in the art. The access control server 12 may also comprise more than one interconnected server as is known in the art.

Access control provided by the access control server 12 may include network protocols, network resources, and electronic devices that may be coupled to the network. Network resources may include network devices such as routers, hubs, firewalls, VPN, and RADIUS (all not shown). Network resources may also include one or more network servers 16, web site/page hosting and email servers 18. Electronic devices that may be coupled to the network 14 may include user workstations 20, printers 22, and user computing devices that may include laptop computers 24, desktop computers 26, and personal digital assistants (PDAs) 28.

The network resources may further include data stored on the various network resources and electronic devices. By way of example, data stored on a network server 16, which may comprise either a public or private server, may comprise a component of the network resources. The data may comprise web sites and web pages, script files, executable files, email files, and other data.

Figure 2:
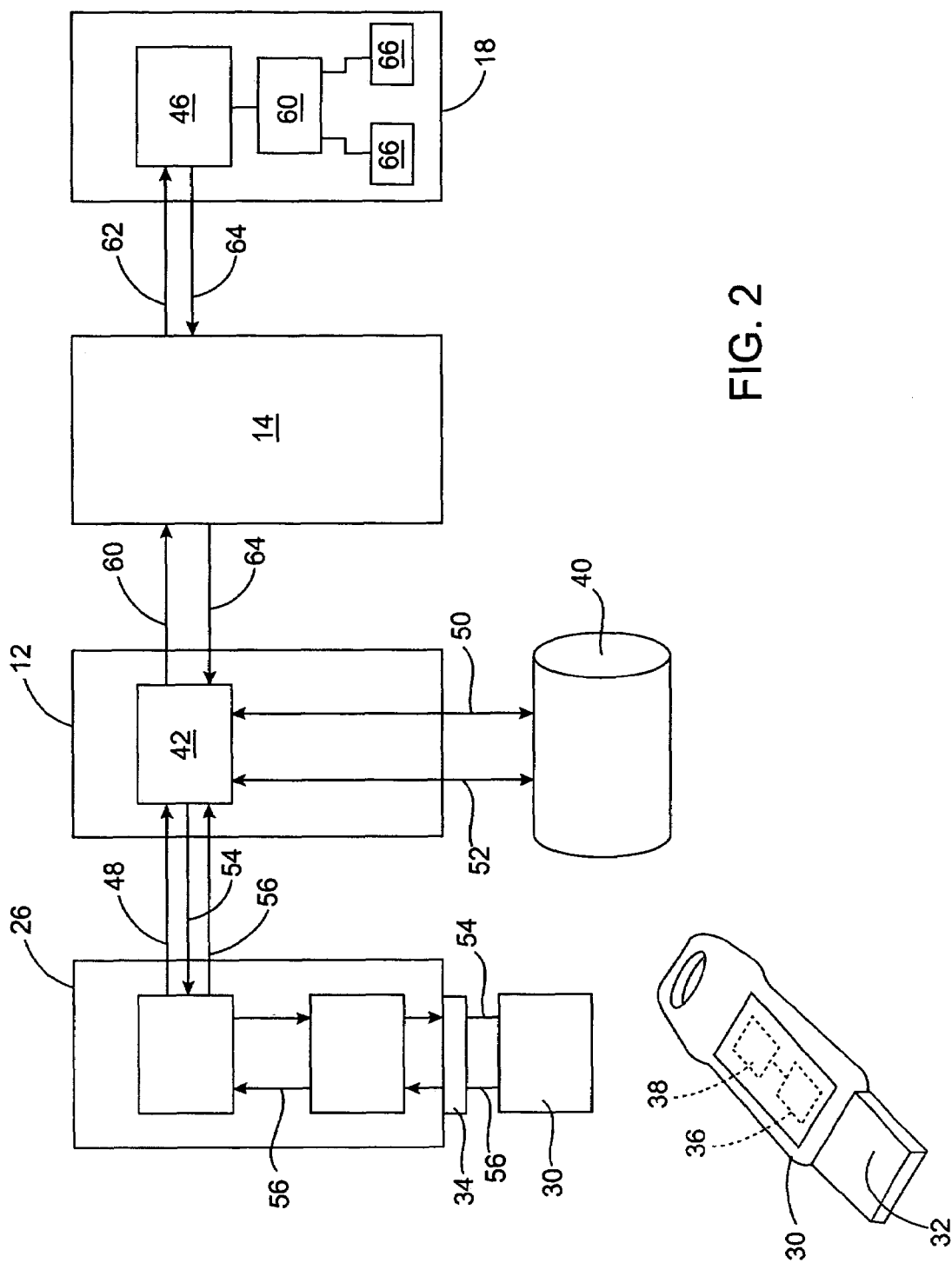
FIG. 2 is a schematic diagram showing an embodiment of a method for strong access control to a network of the present invention.

An embodiment of a method of the present invention is shown in FIG. 2. An authentication device 30 provides two-factor authentication to control access to the network 14. The authentication device 30 is preferably capable of communicating with the access control server 12 via an electronic device, such as a workstation 20, computer 24, 26, or PDA 28.

The authentication device 30 may be provided in a readily portable form factor that allows the device 30 to be carried in a user's personal effects. By way of example, the user device 30 may comprise a token device, or token. The token 30 may be provided with a connector 32 configured to be detachably couple to a data port 34, for connecting the token 30 to the network 14. The connector 32 and data port 34 may be configured in any desired mutually compatible form factor, such as known USB (Universal Serial Bus) for example. The data port 34 may be an integral component of electronic devices, such as workstations 20, computers 24, 26, or PDAs 28. The data port 34 is provided for coupling external devices to the network 14, via the access control server 12, to access network resources.

The token 30 may include an on-board processor 36 that may be capable of processing 128-bit data and a memory device 38 for storing data. The processor 36 may be running a data encryption/decryption algorithm, such as an Advanced Encryption Standard (AES) technology data encryption/decryption algorithm. The memory 38 may comprise a flash memory device that maintains stored data when power to the token 30 is removed.

Tokens 30 may be distributed and assigned to users (not shown) using known techniques. The access control server 12 controls what selected data can accessed by a user, based upon data access privileges assigned to the token 30. The selected data may be determined by an access level assigned to a specific token 30, and thus, assigned to the user. Information for determining the access level of the token 30 may be stored in a database 40 of the access control server 12.

Any attempt by a user to access the network resources commences a network session. A network session may be defined as a period of time between the moment a token 30 attempts to access the network 14 and the moment that the token 30 becomes inactive and no longer has access to the network 14. The token 30 becomes inactive when it is deactivated, logged out, uncoupled from the network 14 or access control server 12, cannot be verified to be active, or in any modes in which the token 30 cannot produce a response to the server 12. When it is determined that the token 30 is inactive, the network session ends.

The access control server 12 may include a processor 42 that may be capable of processing 128-bit data. The processor 42 may be running a data encryption/decryption algorithm, such as an Advanced Encryption Standard (AES) technology data encryption/decryption algorithm. The processor 42 may be coupled to the database 40 for storing and retrieving data.

As in the drawings, a client, or user (not shown), desires to access network resources, which may comprise data, such as a web site 46 stored on a web server 18 of the network 14. The user first couples a token 30 assigned to them to the data port 34 of an electronic device, such as a computer 26.

As shown on data flow path 48, the client may invoke the computer 26 to transmit an initial access request the access control server 12, for accessing the web site 46 stored on the web server 18. At the moment that the initial access request is received by the access control server 12, a network session is commenced and an identification number, referred to in the art as a session ID, may be assigned to the network session.

The access control server 12 receives the initial access request and generates a challenge that is transmitted to the token 30, via the computer 26, shown on data flow path 54. The challenge may be in the form of a 128-bit number. The challenge may include a challenge puzzle and key ID. The challenge may further include a network identifier code, or session identification (ID). The challenge puzzle may function as a set of instructions for accessing selected data stored in the token's memory 38. The selected data may be representative of a Uniform Resource Locator (URL), more commonly known as an Internet address. The URL is an electronic address identifying the location of a file, or files, on the Internet, or other network, consisting of the protocol, the computer on which the file is located, and the file's location on that computer.

Upon receipt of the challenge, the token's processor 36 prepares an initial response by first decomposing the challenge. The processor 36 decomposes the challenge to recover the challenge puzzle and key ID. The challenge may also include the session ID code. The selected data, representing the URL of a desired web site 46 determined by the challenge puzzle is retrieved from memory 38 and fed into the processor 36. An encryption key, determined by the key ID, is also retrieved from memory 38 and fed into the processor 36. Additionally the session ID may be fed into the processor 36. The token's processor 36, preferably running an AES data encryption/decryption algorithm, uses this data to encrypt the URL, to generate the initial response.

The encrypted URL and other identifying information are sent as the initial response to the access control server 12, shown along data flow path 56. The server's processor 42 reads the challenge sent to the token 30 and the initial response. The selected data, representing the desired URL, and key ID determined by the challenge may then be retrieved from the database 40 and fed into the processor 42. The processor 42, preferably running an AES data encryption/decryption algorithm, uses the encryption key to encrypt the desired URL, to generate a response. The access control server 12 then compares its response to the initial response. If the two responses match, the token 30, and thus user, is authenticated and can access the web site 46. If the two responses do not match, then the user is denied access to the server 18.

Upon authentication of the token 30, the user has access to selected data stored on the web server 18 depending upon what can access privileges have been assigned to the token 30. Information relative to the access privileges of the token 30 may be stored in the database 40. The token 30 must remain active while the user is accessing the server 18. Any subsequent requests to the network 14, any network resources, or electronic devices coupled to the network 14, require the token 30 to be active. By way of example, the token 30 becomes inactive when it is removed from the data port 34. In order to again access the network 14, network resources, or electronic devices, the user must again authenticate to the server 12.

Upon authentication of the token 30, the initial response is stored on both the access control server 12 and on the computer 26, or other electronic device that the token 30 may be coupled to. Additionally, the initial response may be stored on the token 30.

The user may have access to selected data such as a home page 60 of the web site 46. The user may transfer data to the home page 60, shown along data flow path 62, or receive data from the home page 60, shown along data flow path 64, as is known. If the user desires to access a secondary web page 66, which may or may not be linked to the home page 66, the user must again authenticate for access to the secondary web page 66.

The user must transmit a subsequent access request to the access control server 12 for accessing the secondary web page 66. Subsequent access request can be encrypted with keys or values derived from the initial authentication. Subsequent access request can also use the token 30 to encrypt the URL of the secondary web page 66. The token 30 generates the subsequent access request by retrieving selected data, representing the URL of the second page 66, from its memory 38 and feeding the data into its processor 36. The initial response stored on the computer 26 and the session ID are also fed into the processor 36. This data is used to encrypt the data representing the URL of the second page 66, and thus generate the subsequent response.

The subsequent response is then transmitted to the access control server 12, shown on data flow path 56. The processor 42 reads the subsequent response received from the token 30 and generates its response. The access control server 12 then compares its response to the subsequent response and if the two responses match, the user is authenticated and can access the secondary web page 66. If the two responses do not match, then the user is denied access to the second page 66. This process is repeated for each web page or other network resource that the user desires to access.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for strong access control to a network, the method comprising the following steps:
    (a) coupling an authentication device to a network;
    (b) transmitting an initial response;
    (c) generating a network response upon receipt of the initial response;
    (d) comparing the initial response and the network response;
    (e) authenticating the authentication device if the initial response and network response match, and not authenticating the authentication device if the initial response and network response do not match;
    (f) providing access to network resources upon authentication of the authentication device;
    (g) transmitting a subsequent response for accessing subsequent network resources;
    (h) comparing the subsequent response to a subsequent network response;
    (i) authenticating the authentication device if the subsequent response and subsequent network response match, and not authenticating the authentication device if the subsequent response and subsequent network do not match; and
    (j) providing access to subsequent network resources upon authentication of the authentication device.

2. The method of claim 1 wherein access to network resources is determined by an access level assigned to the authentication device.

3. The method of claim 1 further comprising:
    (k) determining whether the authentication device is coupled to the network, if the authentication device is not coupled to the network then repeating steps (a) through (f) and if the device is coupled to the network then providing access to network resources upon authentication of the authentication device.

4. The claim 1 further comprising:
    (l) repeating steps (g) through (j) for each subsequent response for accessing subsequent network resources.

5. A method for strong access control to a network, the method comprising the following steps:
    (a) coupling an authentication device to a network;
    (b) generating an access request for accessing network resources;
    (c) generating a challenge upon receipt of the access request;
    (d) generating an initial response upon receipt of the challenge;
    (e) generating an initial network response upon receipt of the initial response;
    (f) comparing the initial response and initial network response;

(g) authenticating the authentication device if the initial response and initial network response match, and not authenticating the authentication device if the initial response and initial network response do not match;
(h) providing limited access to network resources to the authentication device upon authentication of the authentication device;
(i) transmitting a subsequent access request for accessing subsequent network resources;
(j) generating a subsequent network response upon receipt of the subsequent access request;
(k) comparing the subsequent access request and subsequent network response;
(l) authenticating the authentication device if the subsequent access request and subsequent network response match, and not authenticating the authentication device if the subsequent access request and subsequent network response do not match; and
(m) providing limited access to subsequent network resources upon authentication of the authentication device.

6. The method of claim 5 wherein access to network resources is determined by an access level assigned to the authentication device.

7. The method of claim 5 further comprising:
(k) determining whether the authentication device is coupled to the network, if the authentication device is not coupled to the network —then repeating steps (a) through (g) and if the device is coupled to the network then providing access to network resources upon authentication of the authentication device.

8. The claim 5 further comprising: (l) repeating steps (j) through (m) for each subsequent response for accessing subsequent network resources.

9. The method of claim 5 wherein the initial response and initial network response comprise an answer.

10. The method of claim 9 wherein the subsequent access request comprises the answer.

11. The method of claim 9 wherein the subsequent network response comprises the answer.

12. The method of claim 9 wherein each subsequent access request and each subsequent network response comprises the answer.

* * * * *